(No Model.)
G. C. BAKER.
METHOD OF MAKING RODS, RAILS, &c.
No. 395,684. Patented Jan. 8, 1889.
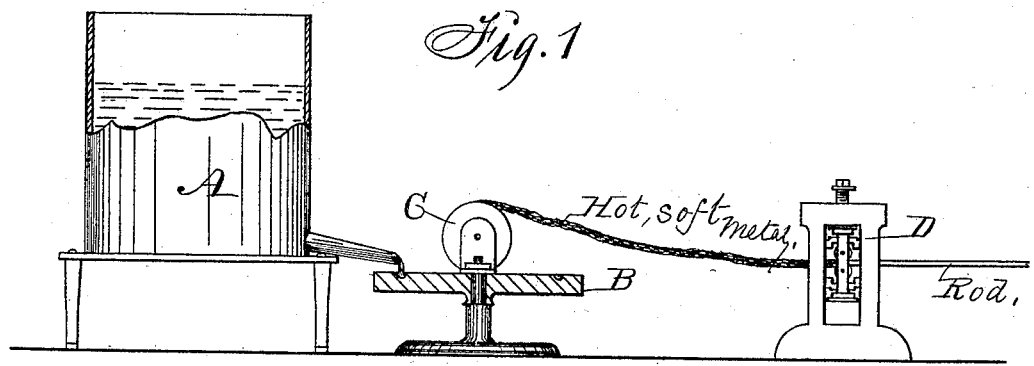
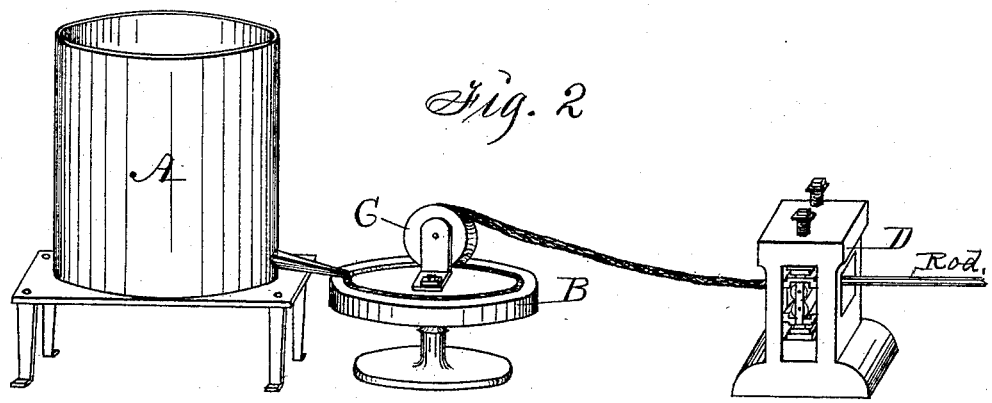
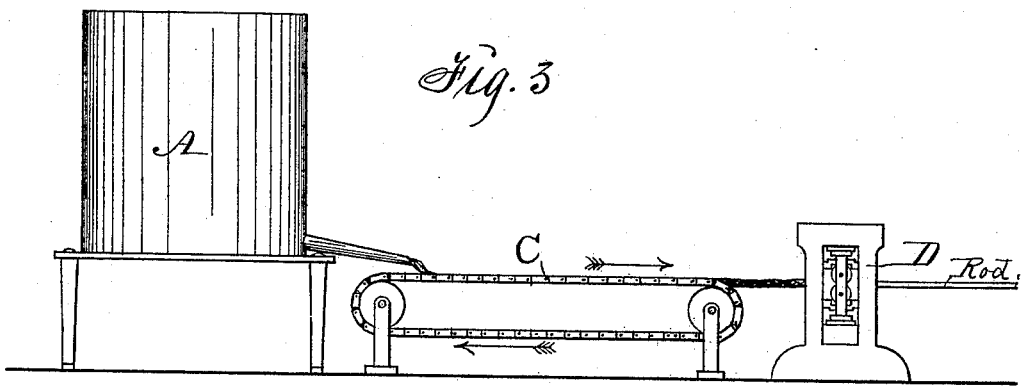
Witnesses:
R. H. Orwig.
M. P. Smith.
Inventor:
George C. Baker,
By Thomas G. Orwig, Atty.

UNITED STATES PATENT OFFICE.

GEORGE C. BAKER, OF DES MOINES, IOWA.

METHOD OF MAKING RODS, RAILS, &c.

SPECIFICATION forming part of Letters Patent No. 395,684, dated January 8, 1889.

Application filed April 21, 1888. Serial No. 271,487. (No model.)

*To all whom it may concern:*

Be it known that I, GEORGE C. BAKER, a citizen of the United States of America, and a resident of Des Moines, in the county of Polk and State of Iowa, have invented a new and useful Method and Apparatus for Making Metal Rods, Bars, and Rails, of which the following is a specification.

My object is to save time and labor in making metal rods and to improve the quality and increase their value.

Heretofore metal has been puddled and formed into balls and blooms, and then shaped into bars and the bars drawn out into rods by passing the metal successively between grooved rollers or a train of grooved rollers.

My invention consists in discharging molten metal into a mold and lifting it from the same mold in a continuous flexible bar and in passing the bar between grooved rollers to produce a continuous rod, as hereinafter set forth, in such a manner that the molten metal will flow in a continuous small stream into a mold, wherein it will be subjected continuously to air to be cooled and formed into a flexible bar, that will have continuous motion imparted to it by means of a device for advancing it to grooved rollers, which will press and shape the bar into a continuous and finished rod.

Figure 1 of the accompanying drawings is a sectional view, and Fig. 2 a perspective view, of an apparatus adapted for practicing my method of making metal rods. Fig. 3 is a view showing a jointed flexible mold that revolves vertically and advances the bar direct to the rollers.

A represents a ladle, crucible, or furnace; B, a rotating mold; C, a device for lifting and advancing a flexible bar from the mold, and D a pair of grooved rollers for reducing the bar and shaping and finishing a rod. The rotating mold consists of a flat-topped circular table that has a continuous circular groove in its top surface adapted to receive and cool the molten metal as it is discharged from the vessel A. This mold is mounted upon a base in such a manner that it can be rotated horizontally.

C is a directing-pulley supported upon a bearer that is fixed to the post that extends through the axis of the rotating mold, or in any suitable way, so that the flexible bar in the groove or mold can be extended over the pulley, and thereby lifted from the mold and advanced to the grooved rollers D and passed through between the rollers, as required, to press and reduce the flexible hot metal and shape it into a rod while it is cooling and hardening.

I claim as my invention—

The herein-described method of making metal rods, which mode or method consists in first melting the metal, then discharging it in a continuous stream into a groove or mold to temper and cool it and to produce a continuous flexible bar, and then passing the flexible bar between grooved rollers to reduce and shape it into a continuous rod.

GEORGE C. BAKER.

Witnesses:
M. P. SMITH,
THOMAS G. ORWIG.